Nov. 7, 1939.        J. H. KELSEY         2,179,095
BAIT BUCKET
Filed Aug. 18, 1937
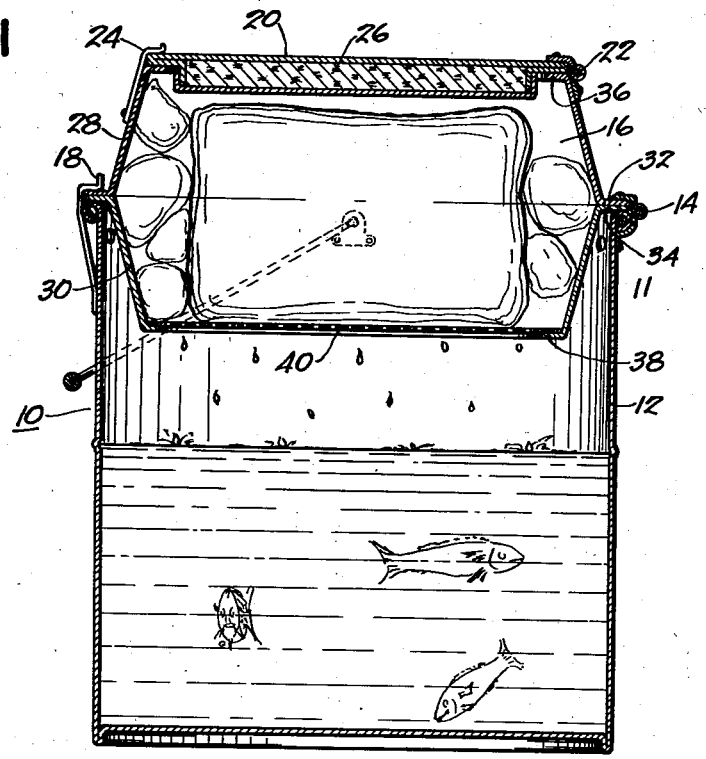
INVENTOR.
JOHN H. KELSEY
BY
P. W. Pomeroy
ATTORNEY.

Patented Nov. 7, 1939

2,179,095

UNITED STATES PATENT OFFICE 2,179,095

BAIT BUCKET

John Howard Kelsey, South Bend, Ind.

Application August 18, 1937, Serial No. 159,628

3 Claims. (Cl. 43—56)

This invention relates to bait buckets and more particularly to bait buckets in which minnows for bait or other varieties of small fish may be maintained alive during lengthy periods of transportation, or fishing, or in hot weather.

An object of this invention is to provide a container having a chamber containing water for small fish, that is maintained at a relatively low temperature.

Another object of my invention is to provide a bait bucket for minnows or the like having adjoining interconnected chambers; one chamber for a coolant and the other for water and small fish.

A feature of this invention is a minnow pail having two compartments, the upper compartment, containing ice, having a perforated bottom permitting the melting ice to cool and aerate the water below containing the fish.

Another feature of my invention is to provide a screen or wire mesh partition between adjoining chambers permitting the circulation of air between the chambers thus carrying the cooled air downwardly from the coolant to lower the temperature of the water in the compartment below containing the fish.

Another feature of my invention is having the ice compartment above and separated from the water containing the fish in such a manner that the melting ice dripping into the fish containing compartment to maintain lower temperatures therein also thoroughly aerates the water by the splashing action of the falling drops of water from the melting ice.

Still another feature of my invention is to provide a bait bucket or live fish shipping can of simple construction and operation and also inexpensive to manufacture and maintain.

These and other objects and features will be readily apparent from the following description and the accompanying drawing in which:

Fig. 1 is a vertical section of a minnow bucket comprising my invention;

Fig. 2 is a fragmentary view of the upper portion of the pail of Fig. 1 with the ice compartment and its cover partially raised;

Fig. 3 is a modified form of my invention applied to larger containers.

Referring to the drawing, Fig. 1 shows a minnow pail 10 or the like having a bucket like portion 12 on the upper edge of which is hinged as at 14 a compartment 16 forming a cover therefor and suitably latched as at 18.

The compartment 16 has a cover 20 hinged as at 22 and a latch 24 to keep the cover closed when not in use. As best shown in Fig. 1 the cover 20 is insulated as at 26 in the usual manner. It is understood that the pail 12 may be insulated on the outside and bottom as may be the upper exposed portion of the chamber 16 if one should so desire.

The chamber 16 is formed of two similar frusto-conical metal portions 28 and 30 flanged at each edge. The large flanged edges 32 and 34 are secured together as by welding or rolling or in any other manner to give a leak proof joint. The flange 36 at the top forms a seat for the lid 20 while the flange 38 supports the perforated plate or screen 40 forming the bottom of chamber 16.

In the modified form shown in Fig. 3 the novel ice chamber 50 is slidably mounted in container 52 carrying the water and fish. The container 50 is shown as a two diameter, cylindrical chamber, the smaller diameter portion 54 and adjoining flange 56 supporting the structure in a conventional type of container such as a milk can. The larger diameter portion forming in this instance the major portion of the coolant chamber 50 is shown insulated. The wire mesh bottom 58 is secured to an annular member 60 suitably fastened against displacement in the lower end portion 54 by a conventional slot and pin locking device 62.

In operation the container 16 is filled with ice through the opening presented when cover 20 is lifted. When bait is desired the container 16 is lifted as a unit hinging at 14 to permit access to the bucket proper. The ice supported above and separate from the water in bucket 12 melts slowly and continuously drips into the water below to maintain it at a low temperature thus preventing the minute air bubbles so necessary to fish life to escape from the water as occurs when the water is permitted to become warm. A low temperature of the water is further obtained by the circulation of the cooled air about the ice downwardly through the screen into contact with the surface water and when warmed upwardly again through the screen to the ice compartment to be again cooled.

Aeration of the water, also necessary to keep the fish lively, is produced by the constant splashing of the drops of ice water through the screen to the surface of the water in the lower container. In filling the device shown in Fig. 3 the top ice container 50 is withdrawn from can 52 and inverted, the screen bottom 58 and annular member 60 now become the cover of this container and when removed the container 50 is readily filled with ice. Once filled and the cover 58—60 replaced the container 50 is again inverted and placed over the can 52 as a cover and fish life prolonging means.

The pail 10 is preferably provided near its top with vents 11 to permit free circulation of air above the water therein and also to assist in keeping the water cool as the warm air is permitted to escape. Although I have shown two forms of my invention it is to be understood that other forms may be resorted to without departing from the spirit and substance of my invention, the scope of which is to be limited only the subjoined claims.

What I claim is:

1. A bait bucket comprising a pail-like member adapted to be substantially half filled with water, means defining a cooling chamber having an annular radial flange to support said chamber substantially at its midplane on the upper edge of said pail-like member, the depending lateral wall of said chamber being spaced inwardly of the defining wall of said member, said cooling chamber being adapted to contain ice, an insulating cover extending substantially entirely across the top of said chamber, a perforated screen forming the bottom wall of said chamber for permitting ice water to drip from said chamber down directly into the water in said pail-like member, said member having a series of openings adjacent its upper rim to permit interchange of air therethrough above the lower end of said cooling chamber whereby warm air from above said water in said pail-like member may be displaced and cool air may move downwardly about the cool walls of said chamber.

2. A bait bucket for live minnows or the like comprising a cylindrical member closed at its bottom and adapted to be partially filled with water, means comprising two frusto-conical members adapted to be secured together about their large edges to form a cooling chamber containing ice and supported on the upper edge of said cylindrical member with substantially half of said chamber disposed within said member, a perforated bottom plate in said chamber for allowing melted ice water to drip down into the water in said member, an insulated cover hinged to the top of said chamber and entirely closing the small end of the upper member, and means formed in said cylindrical member adjacent its upper edge allowing air to pass into said member along the side walls of that portion of the cooling chamber disposed within said member.

3. A bait bucket comprising a pail-like member adapted to be partially filled with water, means forming a chamber having a central radial flange resting on the upper edge of said pail, said chamber diminishing in cross section from said flange toward opposite ends thereof whereby the depending portion of said chamber within said pail-like member is spaced radially inwardly of the lateral wall thereof to form an annular space therebetween, an insulating cover hinged to the upper end of said chamber and extending thereacross, a perforated bottom wall in said chamber disposed above the water in said pail-like member, said chamber being adapted to contain ice whereby the melting ice water drips through said bottom wall into the water in said pail-like member, and warm air rising from said water in said pail-like member is cooled in said annular space.

JOHN HOWARD KELSEY.